United States Patent Office 2,727,934
Patented Dec. 20, 1955

2,727,934
CHLORINATED RUBBER EMULSIONS

Werner C. Brown, Deerhurst, Del., assignor to Hercules Powder Company, Wilmington, Del., a corporation of Delaware No Drawing. Application February 6, 1953, Serial No. 335,593

18 Claims. (Cl. 260—735)

The invention relates to a method for producing an improved chlorinated rubber emulsion and to the emulsion thus produced. In a specific aspect this invention relates to a method for improving the properties of chlorinated rubber lacquer emulsions by incorporating novel surface-active agents in said emulsions and to the emulsions thus produced.

In recent years chlorinated rubber lacquer emulsions have been found to be useful as coating compositions for porous materials such as paper, leather, fabrics, and the like. However, in other fields where coating compositions are rather extensively used, the use of chlorinated rubber lacquer emulsions has been quite limited because of the poor water resistance and the low gloss characteristics of the emulsions. Also, the use of these lacquer emulsions as metal finishes has been somewhat restricted because of the poor gloss and unsatisfactory drying characteristics of the emulsions.

Heretofore chlorinated rubber lacquer emulsions have been prepared by mixing a chlorinated rubber lacquer with a water solution or suspension of an emulsifying agent using various proportions of lacquer to water solution or suspension. Lacquer-in-water emulsions have been prepared most easily by adding the lacquer to the water solution or suspension of the emulsifying agent or agents while the latter phase is being agitated. Subsequently the resulting "coarse" emulsion was further refined in a colloiding or homogenizing operation to improve the stability of the emulsion.

Certain combinations of emulsifying agents and protective colloids or emulsion stabilizers have been found rather effective in chlorinated rubber lacquer emulsions, but these combinations still have undesirable shortcomings. Probably foremost among these undesirable features is the inability of the emulsifier system to become an integral part of the emulsion film after application to the porous material. This disadvantageous feature often results in poor gloss and low water resistance of the emulsion film. Other undesirable features of these chlorinated rubber lacquer emulsions are difficulty of emulsification and poor emulsion stability, particularly of pigmented emulsions.

It is an object of this invention to provide a method for producing improved chlorinated rubber emulsions.

It is another object of this invention to provide a method for producing chlorinated rubber lacquer emulsions of improved stability.

It is another object of this invention to provide a method for producing chlorinated rubber lacquer emulsions wherein only simple mixing and stirring methods are required to produce a stable emulsion.

It is another object of this invention to provide novel chlorinated rubber emulsions.

It is a further object of this invention to provide novel chlorinated rubber lacquer emulsions of improved physical properties.

Further and additional objects of this invention will be apparent from the disclosure hereinbelow.

The above objects and other beneficial advantages of this invention are accomplished by incorporating in the chlorinated rubber emulsion a nonionic addition product of an alkylene oxide.

The following examples are illustrative of practical embodiments of this invention. In these examples a chlorinated rubber containing about 67% chlorine and formed by the chlorination of natural rubber was employed. The chlorinated rubber had a viscosity range of 115–180 cps. as detemined in a 20% concentration by weight in toluene at 25° C. All compositions are shown in parts by weight.

Example 1

In each of the following runs a lacquer having the following composition was employed.

| | |
|---|---:|
| Chlorinated rubber | 30.0 |
| Dibutyl phthalate | 12.4 |
| Ester gum | 7.1 |
| Xylene | 50.5 |
| Per cent solids | 49.5 |

In run 1 a conventional chlorinated rubber aqueous emulsion having a composition that was preferred prior to this invention was employed. The lacquer phase was poured into the aqueous phase and the mixture was agitated with a stirrer at a speed of 800 R. P. M. In run 2 a lacquer emulsion within the scope of this invention was similarly prepared by pouring the aqueous phase into the lacquer phase, and in run 3 another emulsion within the scope of this invention was similarly prepared by adding the lacquer phase to the aqueous phase. The following data were observed:

| | Run 1 | Run 2 | Run 3 |
|---|---|---|---|
| Lacquer Phase: | | | |
| Chlorinated rubber lacquer | 100.0 | 97.5 | 98.0. |
| Synthetic B79 | | 2.0 | 2.0. |
| Dioctyl sodium sulfosuccinate | | 0.5 | |
| Aqueous Phase: | | | |
| Distilled water | 99.0 | 99.5 | 99.5. |
| Dioctyl sodium sulfosuccinate | 1.0 | 0.5 | 0.5. |
| Ratio Lacquer Phase to Aqueous Phase | 2.5:1 | 2.5:1 | 2.5:1. |
| Viscosity in Cps | 47 | 974 | 230. |
| Type of Emulsion | Water in lacquer. | Lacquer in water. | Lacquer in water. |
| Stability in Days | broke | 20 | 100+. |

Synthetic B79 is a nonionic surface-active agent marketed by Hercules Powder Company. It is an adduct formed by the interaction of an alkylated phenol and ethylene oxide.

Example 2

In each of the following runs a lacquer having the following composition was employed.

| | |
|---|---:|
| Chlorinated rubber | 30.0 |
| Chlorinated paraffin wax | 10.0 |
| Hi-flash naphtha | 30.0 |
| Xylene | 30.0 |
| Per cent solids | 40.0 |

In run 4 an aqueous emulsion was prepared in a manner similar to that of run 1. Similarly, runs 5 and 6 correspond to runs 2 and 3, respectively. The following data were observed.

| | Run 4 | Run 5 | Run 6 |
|---|---|---|---|
| Lacquer Phase: | | | |
| Chlorinated rubber lacquer | 100.0 | 97.5 | 98.0. |
| Synthetic B79 | | 2.0 | 2.0. |
| Dioctyl sodium sulfosuccinate | | 0.5 | |
| Aqueous Phase: | | | |
| Distilled water | 99.0 | 99.5 | 99.5. |
| Dioctyl sodium sulfosuccinate | 1.0 | 0.5 | 0.5. |
| Ratio Lacquer Phase to Aqueous Phase | 2.5:1 | 2.5:1 | 2.5:1. |
| Viscosity in Cps | | 2,700 | 790. |
| Type of Emulsion | | Lacquer in water. | Lacquer in water. |
| Stability in Days | broke | 100+ | 100+. |

Example 3

Desirable and improved chlorinated rubber aqueous emulsions can be produced by employing the following nonionic surface-active agents:

(1) An adduct formed by the interaction of dehydrogenated rosin and ethylene oxide.
(2) A polyglycol ether derivative of the monolauric ester of sorbitan (Tween 20 by Atlas Powder Company).
(3) A polyglycol ether derivative of the monostearic ester of sorbitan (Tween 60 by Atlas Powder Company).
(4) A polyalcohol ether of an alkylated phenol (Triton X–100 and Triton X–45 by Rohm and Haas Company).

The above data clearly demonstrate advantages of this invention. The new chlorinated rubber lacquer emulsions have an improved stability, and by practicing this invention it is possible to form stable emulsions when using only mild agitation during the formation of the emulsion. It should also be noted that, when practicing this invention and when employing an ionic surface-active agent as well as a nonionic surface-active agent, emulsions of increased viscosity are obtained by incorporating the ionic surface-active agent in both the aqueous phase and the lacquer phase of the emulsion.

The surface-active agents or wetting agents within the scope of this invention are of the water-soluble, nonionic type having hydrophilic groups which do not ionize. This property suggests an improvement over the cationic and anionic types of surface-active agents for use in lacquer emulsions since these latter types of surface-active agents are frequently unstable in the presence of inorganic pigments or other electrolytes which are present in the lacquer emulsion, either as necessary components or as impurities. Typical nonionic surface-active agents are condensates or addition products (adducts) of an alkylene oxide such as ethylene oxide, propylene oxide, butylene oxide, and the like. Ethylene oxide is the preferred alkylene oxide, and it will be employed in describing the details of the invention, but it will be understood that other similar alkylene oxides can be used in a similar capacity. To form the nonionic surface-active agent, the alkylene oxide, preferably ethylene oxide, is condensed with an organic compound containing a reactive hydrogen atom, for example, carboxylic acids, alcohols, phenols, amines, amides, and the like. Typical compounds are dehydrogenated rosin, alkylated phenols, mixtures of rosin and fatty acids, sorbitan monolaurate, and sorbitan monostearate. In forming the condensates or adducts the alkylene oxide and organic compound containing a reactive hydrogen atom are interacted, preferably in the presence of an alkaline catalyst, and condensed in varying molar proportions by replacement of reactive hydrogen by alkylene oxide. For example, a typical adduct can be produced by condensing 15 moles of ethylene oxide with dehydrogenated rosin. The resulting product is a mixture of adducts containing varying proportions of ethylene oxide and dehydrogenated rosin as well as polymerized ethylene oxide, and this product mixture can be used as the nonionic surface-active agent in this invention. In the same manner 10 moles of ethylene oxide can be condensed with one mole of dehydrogenated rosin to produce a mixture of adducts containing ethylene oxide and dehydrogenated rosin in varying molar proportions as well as condensed ethylene oxide. This product can similarly be used in practicing this invention. In the same manner varying molar proportions of alkylene oxide and organic compounds containing a reactive hydrogen atom can be used to form nonionic addition products which are effective surface-active agents within the scope of this invention.

The amount of adduct that is required in practicing this invention is variable and dependent upon such factors as the composition of the lacquer solution, the actual adduct or nonionic surface-active agent employed, and the like. In general, the amount will be such that the nonionic surface-active agent will represent from 1% to 4% of the total weight of the lacquer phase.

The nonionic surface-active agents discussed above can be used as the sole emulsifier for preparing chlorinated rubber lacquer emulsions. However, it has been found that improved results can be obtained when these nonionic surface-active agents are employed in conjunction with more active ionizable emulsifiers. All the ionizable emulsifier can be in the aqueous phase, and alternatively the ionizable emulsifier can be used in both phases. In the examples an emulsion of increased viscosity was obtained when the ionizable emulsifier was present in both phases. These ionizable emulsifiers can be of the cationic or anionic type. The preferred coemulsifier is dioctyl sodium sulfosuccinate, but other coemulsifiers can be used. For example, fatty alcohol sulfonates and their salts (fatty alcohol sulfates), an alkali metal salt of an alkyl-substituted naphthalene sulfonate, and the like, can be used as a coemulsifier. The amount of ionizable coemulsifier that is used is variable and in general within the range of 0.5% to 1.0% by weight of the water phase employed.

As a result of the use of these coemulsifiers with the nonionic surface-active agents discussed above, smooth and substantially stable emulsions can be made when using only simple high-speed stirring to intermix the lacquer and aqueous phases, and the films resulting from the application of these emulsions show markedly improved properties.

Generally speaking the chlorinated rubber lacquer emulsions of this invention comprise chlorinated rubber in solution in a substantially water-immiscible solvent or solvent mixture. The emulsions may also contain suitable pigments, for example, carbon black and the like, for producing the desired color in the emulsions. The emulsions are generally of the oil-in-water type, and the chlorinated rubber solution employed in producing the emulsion may contain such other ingredients as may be necessary for the production of, for example, a coating composition.

Emulsions in accordance with this invention include solutions of chlorinated rubber having a concentration of chlorinated rubber within the range of 10% to 40%. The ratio of chlorinated rubber solution to water in the ultimate emulsion is desirably within the range of 2:1 to 3:1 by weight. In the preparation of the emulsion any desired type of chlorinated rubber can be used, and the particular type of chlorinated rubber that is used will depend upon the ultimate use of the emulsion. In general, chlorinated rubbers of the type heretofore used in lacquer emulsions can be used to produce the emulsions within the scope of this invention. The chlorinated rubber can have a wide range of viscosity depending upon the ultimate use of the emulsion. For example, the chlorinated rubber can have a viscosity as measured in a 20% solution in toluene of 5 cps. or lower. On the other hand, the chlorinated rubber can have a relatively high viscosity, for example, 200 cps. or higher. The chlorine content of the chlorinated rubber can also vary within rather wide limits. It is preferred that the chlorine content be from about 60% to about 70% with the preferred chlorine content being about 67%. The chlorinated rubber can be prepared by any of the known methods for chlorinating either natural rubbers, such as hevea rubber, balata, gutta percha and the like, or synthetic rubbers, such as polybutadiene, polymerized chlorobutadiene, rubber hydrochloride, isoprene, the polybutylenes, butadiene copolymers and the like which are unsaturated and capable of undergoing chlorination.

Any desired water-immiscible solvent or solvent mixture for the chlorinated rubber can be used. For example, the more commonly used solvents are aromatic hydrocarbons, such as toluene and xylene. Less commonly used solvents are esters, such as amyl acetate, butyl acetate, octyl acetate, and the like, ketones, such as methyl ethyl ketone, methyl isobutyl ketone, and the like, and chlorinated hydrocarbons, such as carbon tetrachloride. If desired, various cosolvents, for example, acetone, ethyl ether, butyl alcohol, ethyl alcohol, and the like, can be employed in a solvent mixture. Also, diluents can be used with the solvent or solvent mixture, for example, turpentine, hexane, heptane, mineral spirits, VM and P naphtha, and the like, or mixtures thereof. The particular solvent or solvent mixture including a diluent or diluents which can be uesd in the case of any given emulsion will be dictated by the ultimate use for which the emulsion is intended, the type of surface to which it is to be applied, the conditions under which it is to be dried, etc. The chlorinated rubber solution can contain various ingredients adapting it for the formation of, for example, a film or coating having desired characteristics. Thus, the chlorinated rubber solution can contain various ingredients generally used in the formation of lacquers or lacquer enamels such as plasticizers, for example, triphenyl phosphate, tricresyl phosphate, etc., or mixtures thereof. The usual gums and resins such as ester gum, dammar gum, alkyd resins, particularly the glycerol phthalate type, rosin maleate resins, and the like, can also be included. Where a plasticizer and/or a gum or resin is included in the chlorinated rubber solution, it can be included in any desired proportion depending upon the desired characteristics for the film or coating to be produced from the emulsion.

The property of lacquer particles, which represent the dispersed phase of a lacquer emulsion, to coalesce and form smooth continuous films when the water or continuous phase has evaporated, is largely dependent upon the viscosity of the lacquer particles or the viscosity of the lacquer solution. Thus, in lacquer emulsions of low solids content the maximum per cent solids that can easily be laid down upon a surface to be coated is quite limited. The incorporation of the nonionic surface-active agents of this invention into a high solids lacquer improves the ability of the high viscosity particles to coalesce. Also, much shorter times are required for the emulsions to clear or rid themselves of water after application to a surface to be coated. Further, improved smoothness, clarity and gloss of the applied films have been noted.

The most effective anionic and cationic emulsifiers presently used in chlorinated rubber lacquer emulsions are incompatible with the lacquer solids. Since these emulsifiers are water-soluble, they are subject to leaching out when films in which they are dispersed are exposed to water. Consequently, these films have poor water resistance. To minimize the effect of such leaching out, these emulsifiers are generally used in small concentrations, but the low concentration requirement limits the effectiveness of the emulsifier. Also as a result of the use of limited concentrations of emulsifier, emulsification of the lacquer and aqueous phases is difficult, and the resulting emulsion has an undesirably low stability. The incorporation of nonionic surface-active agents improves the water resistance of emulsion films which contain even more than the minimum amount of an ionizable water-soluble emulsifying agent. A possible explanation of this apparent synergistic effect is that the nonionic agents which are less water-soluble and more oil-soluble than the ionic emulsifying agents aid in solubilizing the ionic emulsifying agent in the lacquer solids.

The stability of emulsions is considered to be a function of the efficiency of the emulsifying equipment employed as well as the effectiveness of the emulsifying agents in producing consistently small particles. The cost of colloiding or homogenizing equipment that is required for making stable emulsions as well as the cost of the colloiding operations generally detracts from the advantages of emulsions. The lacquer emulsions within the scope of this invention and containing noninonic surface-active agents are more easily emulsified than emulsions of the same composition but containing no nonionic surface-active agent. In particular, it was found that stable emulsions containing the nonionic surface-active agents described above could be produced when employing an air powered stirrer or other simple agitating means to intermix the lacquer and aqueous phases. No colloiding or homogenizing equipment was required for the production of stable emulsions. However, heretofore such equipment was necessary for the production of stable emulsions when either cationic or anionic emulsifiers were employed without any nonionic surface-active agents. Furthermore, the films resulting from the emulsions within the scope of this invention in general have properties equivalent to those that are produced by passage of the same emulsion through a colloiding or homogenizing mill. Evidence that these nonionic emulsifiers improve ease of emulsification is shown by the fact that lower solids emulsions than those evaluated in the above examples are much less stable and produce films of inferior properties when compared in a similar manner and using emulsifying systems containing anionic or cationic emulsifying agents.

The incorporation of the nonionic surface-active agent in the emulsion imparts better resistance to breaking by freezing than ionic emulsifiers. This fact was observed when a group of lacquer emulsions was exposed to freezing temperatures. Without exception, those emulsions that contained ionic emulsifiers broke as a result of the freezing. On the other hand, those emulsions containing nonionic surface-active agents did not break.

Numerous modifications within the scope of this invention will be apparent from the above detailed disclosure.

What I claim and desire to protect by Letters Patent is:

1. The method of producing an improved chlorinated rubber lacquer emulsion which comprises agitating a solution of chlorinated rubber in a water-immiscible volatile organic solvent with water in the presence of a nonionic addition product of an alkylene oxide to produce a lacquer-in-water emulsion of improved stability.

2. The method of producing an improved chlorinated rubber lacquer emulsion which comprises agitating and intimately admixing water and a solution of chlorinated rubber in a water-immiscible volatile organic solvent and containing a nonionic addition product of an alkylene oxide and a compound containing a reactive hydrogen atom to produce a lacquer-in-water emulsion of improved stability.

3. The method of producing an improved chlorinated rubber lacquer emulsion which comprises agitating and intimately admixing water and a solution of chlorinated rubber in a water-immiscible volatile organic solvent and containing from 1% to 4% by weight, based on said solution, of a nonionic addition product of ethylene oxide and a compound containing a reactive hydrogen atom to produce a lacquer-in-water emulsion of improved stability.

4. The method of producing an improved chlorinated rubber lacquer emulsion which comprises agitating water and a solution of chlorinated rubber in a water-immiscible volatile organic solution and containing from 1% to 4% by weight, based on said solution, of a nonionic addition product of ethylene oxide and a compound containing a reactive hydrogen atom to produce a lacquer-in-water emulsion of improved stability, said water and said solution containing an ionizable surface-active agent.

5. The method according to claim 4 wherein the compound containing a reactive hydrogen atom is dehydrogenated rosin.

6. The method according to claim 4 wherein the compound containing a reactive hydrogen atom is an alkylated phenol.

7. The method according to claim 4 wherein the nonionic addition product is a polyglycol ether derivative of the monolauric ester of sorbitan.

8. The method according to claim 4 wherein the nonionic addition product is a polyglycol ether derivative of the monostearic ester of sorbitan.

9. The method according to claim 4 wherein the nonionic addition product is a polyalcohol ether of an alkylated phenol.

10. The method according to claim 4 wherein the ionizable surface-active agent is dioctyl sodium sulfosuccinate.

11. An aqueous chlorinated rubber lacquer emulsion comprising a solution of chlorinated rubber in a water-immiscible volatile organic solvent as the dispersed phase, water as the continuous phase, and a nonionic addition product of an alkylene oxide and a compound having a reactive hydrogen atom.

12. An aqueous chlorinated rubber lacquer emulsion comprising water as the continuous phase and a solution of chlorinated rubber in a water-immiscible volatile organic solvent as the dispersed phase and containing from 1% to 4% by weight, based on said solution, of a nonionic addition product of an alkylene oxide and a compound having a reactive hydrogen atom, and said water and said solution containing an ionizable surface-active agent.

13. An emulsion according to claim 12 wherein a nonionic addition product of ethylene oxide and dehydrogenated rosin is employed.

14. An emulsion according to claim 12 wherein a nonionic addition product of ethylene oxide and an alkylated phenol is employed.

15. An emulsion according to claim 12 wherein the nonionic addition product is a polyglycol ether derivative of the monolauric ester of sorbitan.

16. An emulsion according to claim 12 wherein the nonionic addition product is a polyglycol ether derivative of the monostearic ester of sorbitan.

17. An emulsion according to claim 12 wherein the nonionic addition product is a polyalcohol ether of an alkylated phenol.

18. An emulsion according to claim 12 wherein the ionizable surface-active agent is dioctyl sodium sulfosuccinate.

References Cited in the file of this patent

UNITED STATES PATENTS

| | | |
|---|---|---|
| 2,008,558 | Laufenberg | July 16, 1935 |
| 2,586,124 | Van Amerongen | Feb. 19, 1952 |
| 2,663,747 | Ten Have | Dec. 22, 1953 |